Dec. 18, 1928.

W. G. WEHR 1,695,623

HOIST TROLLEY FRAME

Filed July 11, 1927  3 Sheets-Sheet 1

Inventor
William G. Wehr
Knox Hudson & Kent.
Attorney

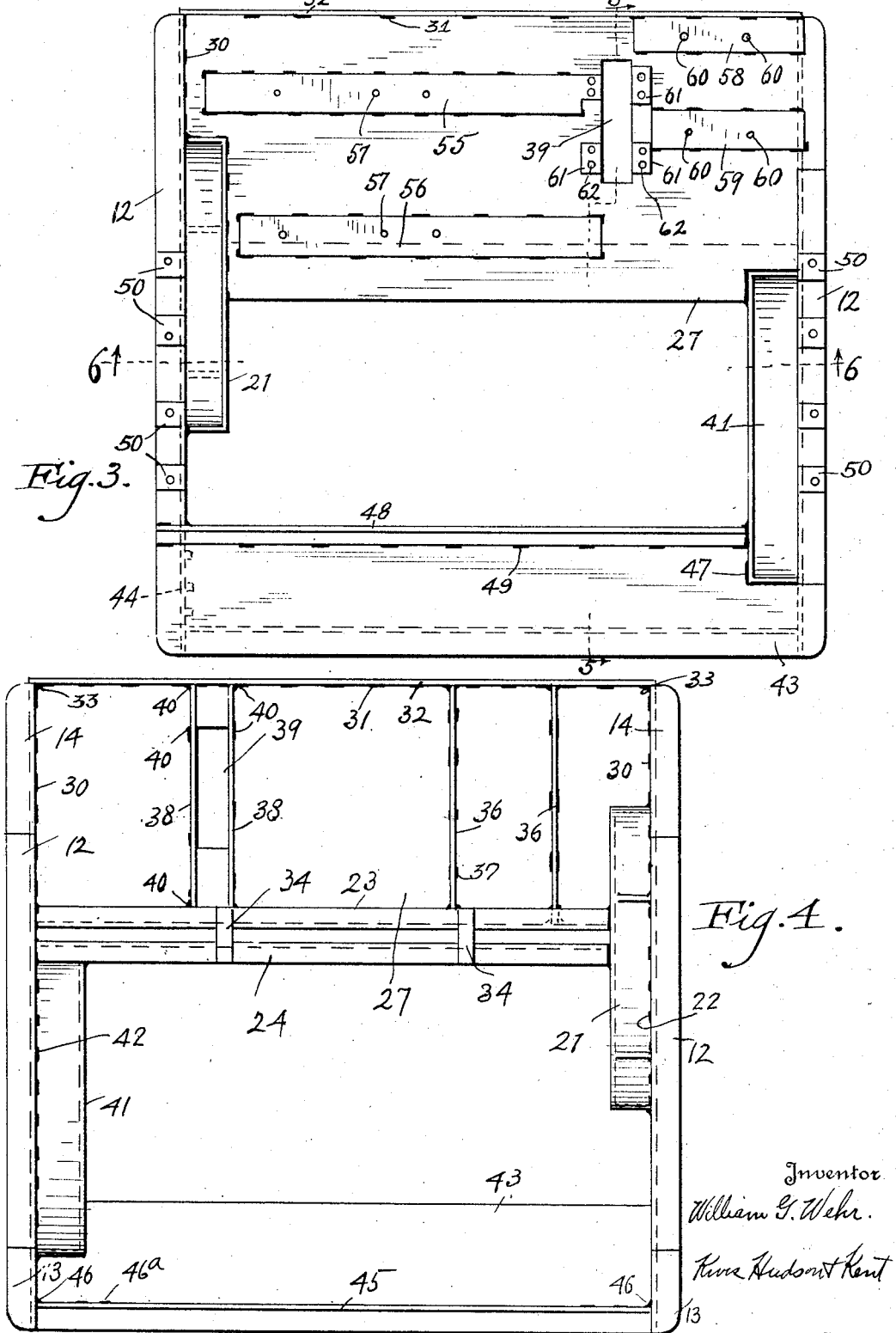

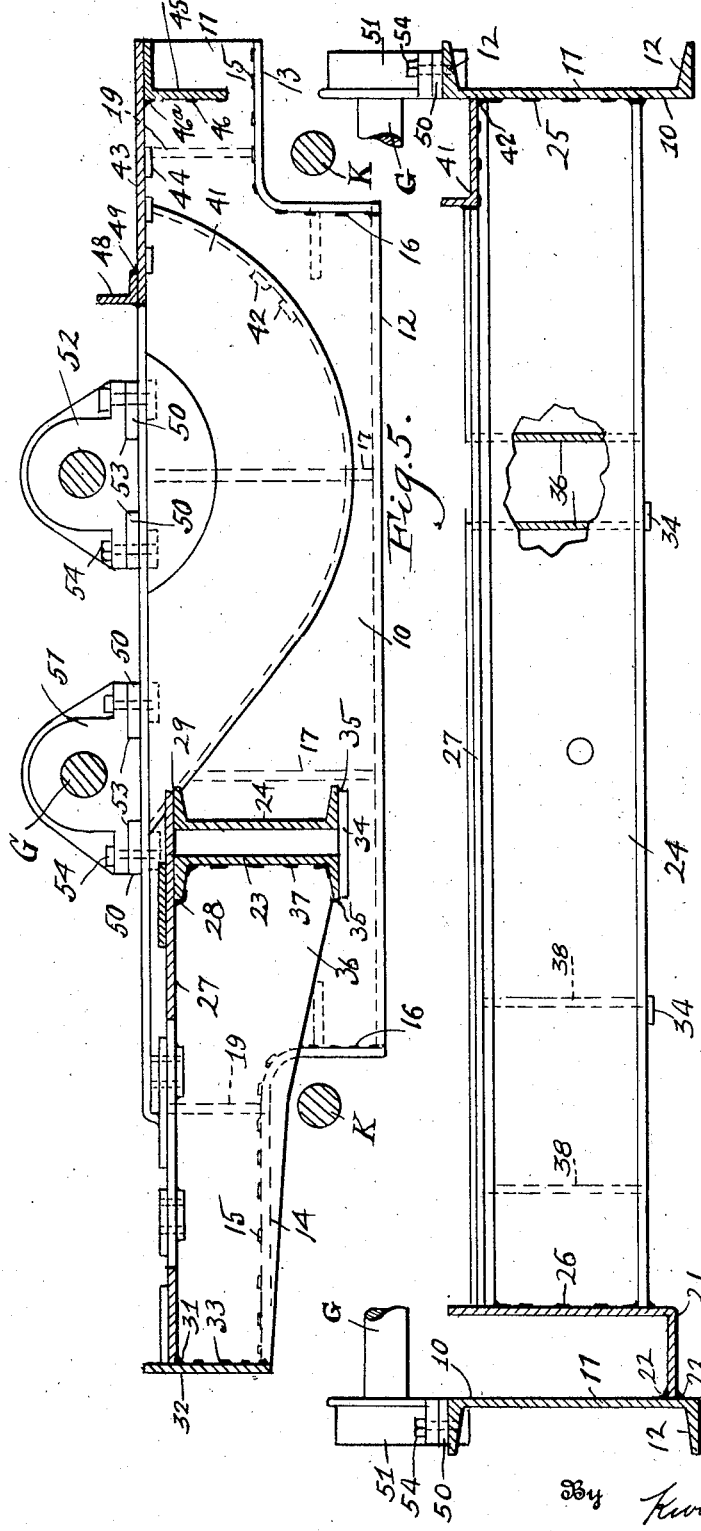

Patented Dec. 18, 1928.

1,695,623

UNITED STATES PATENT OFFICE.

WILLIAM G. WEHR, OF EAST CLEVELAND, OHIO, ASSIGNOR TO THE CLEVELAND CRANE & ENGINEERING COMPANY, OF WICKLIFFE, OHIO, A CORPORATION OF OHIO.

HOIST-TROLLEY FRAME.

Application filed July 11, 1927. Serial No. 204,783.

This invention relates to frames for hoist trolleys such as employed for heavy duty cranes and has for its object to provide a trolley frame possessing superior strength, rigidity and durability, which is of relatively light and compact construction and which can be manufactured at a relatively low cost.

Trolley frames of the character referred to are required to carry very heavy loads and in their travel with such loads may be subjected to enormous racking stresses. Consequently, such frames must be so constructed as to possess great strength and rigidity in order to withstand the stresses to which they are subjected.

Fabricated steel frames composed of rolled structural elements riveted together become weakened in service due to the fact that the riveted joints are gradually loosened by the racking stresses. One method of overcoming this difficulty has been to make the frame in the form of a solid, one-piece casting, but this method is open to the objection that the frame must necessarily be made much heavier and to the objection that the cost of manufacture is much higher. In order to obtain the necessary strength in the casting, it is necessary to greatly increase the depth of the frame and the thickness of the parts, and the cost of manufacture is high due to the complicated molds required and due to the difficulties incident to the handling of the heavy castings and performing the necessary machining operations thereon.

The present invention provides a fabricated trolley frame which possesses the rigidity and durability desirable in such a frame but which is lighter and more compact than either a cast frame or a frame formed of structural elements riveted or bolted together.

A further object of the invention is to provide a trolley frame composed wholly of rolled bars and plates in which all of the parts are integrally united by welding.

A further object is to so join and reenforce or stiffen the side and cross members that the necessary strength and rigidity may be embodied in a relatively shallow frame.

A further object is to provide means by which the machining operations upon the plates and structural elements of the frame are avoided.

With the above and other objects in view, the invention may be said to comprise the structure as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which:

Fig. 3 is a top plan view of the trolley frame with the mechanism omitted.

Fig. 4 is a bottom plan view of the frame.

Fig. 5 is a longitudinal section taken on the line indicated at 5—5 in Fig. 3.

Fig. 6 is a transverse section taken on the line indicated at 6—6 in Fig. 3.

Figure 1:
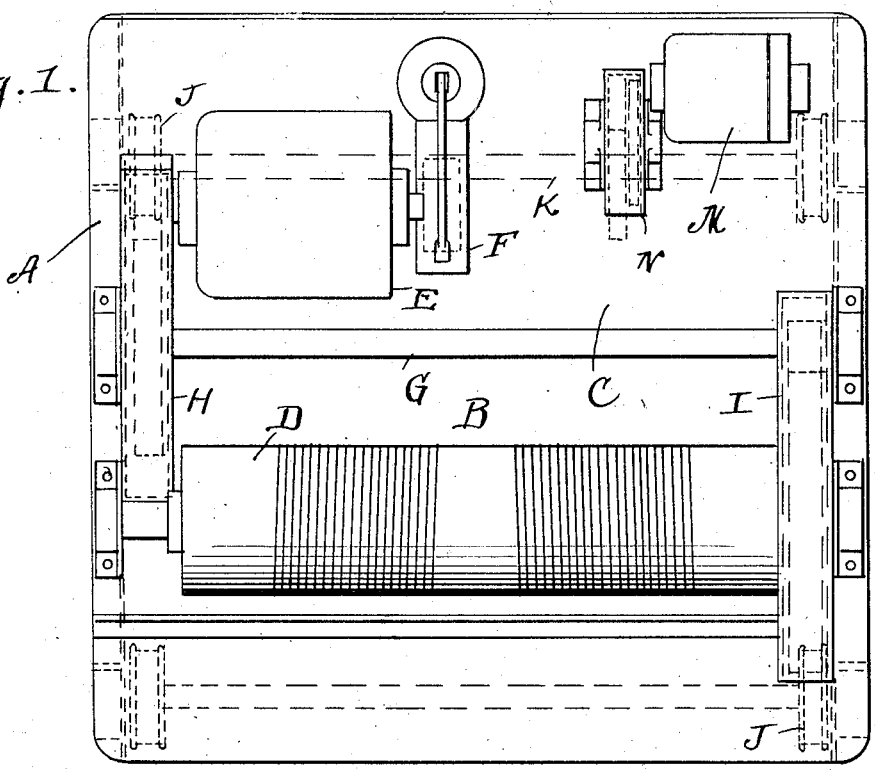
Fig. 1 is a plan view of a crane hoist trolley constructed in accordance with the present invention.
Figure 2:
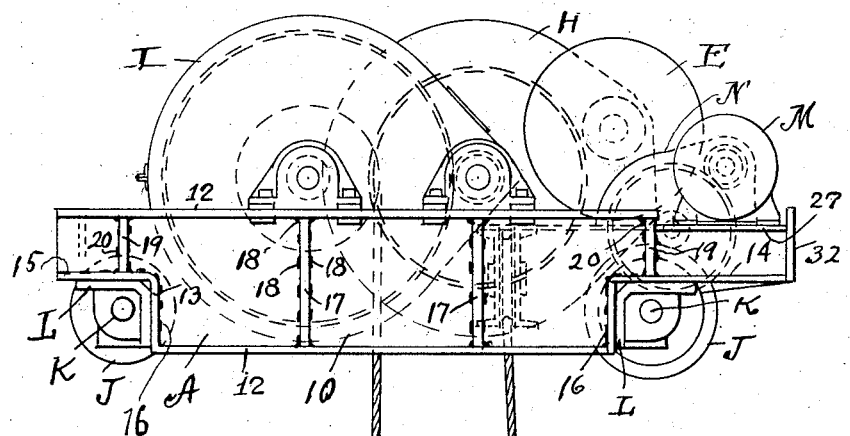
Fig. 2 is a side elevation of the trolley.

Referring to Figs. 1 and 2 of the drawings, the trolley frame is indicated generally by the reference character A. This frame is provided with a transverse opening B intermediate the ends thereof and with a motor supporting platform C at one side of the opening. A hoist drum D extends across the frame directly above the opening and is operated by means of a hoist motor E mounted upon the platform C. The motor E is provided with the usual brake F and drives a cross shaft G through suitable gearing in a housing H mounted at one side of the frame A. The shaft G extends across the frame parallel with the drum D and drives the drum through suitable gearing in a housing I mounted upon the side of the frame opposite that to which the housing H is attached. The trolley is provided with supporting wheels J which are adapted to travel upon the rails of an overhead trackway, the wheels J being carried by axles K which extend through bearing members L at opposite ends of the frame. A rack motor M is mounted upon the platform C and is geared to the rear axle K through gearing in a suitable housing N.

The mechanism above described is old and well known and is herein shown and described merely for the purpose of making clear the purpose of the present invention which resides in the structure of the trolley frame.

The frame A has side members 10 of rolled structural steel which are preferably in the form of channels having vertically disposed webs 11 and outwardly extending flanges 12. The opposite ends of the side members 10 are undercut, as shown in Figs. 2 and 5, to receive the axle bearing members L, and the undercut portions are provided with shoulder plates 13 and 14 of L shape which bear against the edges of the webs 11 and are integrally united thereto by welds 15 and 16. Intermediate the ends thereof, the channel side members 10 are reenforced by vertical ribs 17 which extend between the flanges 12 and are integrally united with the flanges and web along their upper, lower and inner edges by welds 18. The end portions of the side members above the undercut portions thereof are stiffened by means of rib plates 19 integrally united along their edges to the web 11 and to the shoulder plates 13 and 14 by welds 20. To the inner side of one of the side members 10 there is attached a gear pocket 21 which is in the form of a heavy stamping having an edge flange which abuts the inner face of the web 11 and is integrally united thereto by welds 22 along the length of the flange.

Adjacent the forward portion of the platform C, the frame is reenforced by two main load supporting members 23 and 24 in the form of channels arranged back to back. The channels 23 and 24 extend between the gear pocket 21 and the opposite side member and these cross bars at one end are integrally united to the web of the side member by welds 25 and at the opposite end to the gear pocket 21 by welds 26.

The motor supporting platform C is formed by a relatively heavy plate 27 which extends between the side members 10 and has its forward edge portion resting upon the cross channels 23 and 24. The flanges of the cross members 23 and 24 are integrally united with the plate 27 by welds 28 and 29 extending along the edges of the upper flanges thereof which serve to join the cross bars to the under side of the plate. The opposite side edges of the plate 27 abut the webs 11 of the opposite side members and these side edges are integrally united with the side members by welds 30. At its rear edge, the plate 27 is integrally united by welds 31 with an end cross bar 32 which, in addition to being integrally united throughout its length with the plate 27, abuts the ends of the webs 11 and is integrally united to the webs by welds 33. The cross bars 23 and 24 are reenforced by cross strips 34 integrally united at intervals to their lower flanges by welds 35.

The motor supporting platform is further stiffened by means of ribs 36 extending parallel with the side members beneath the portion of the platform on which the hoist motor is mounted, and these ribs are integrally united to the under side of the plate 27, to the end cross bar 32 and to the web and flanges of the cross bar 23 by welds 37. The portion of the platform on which the rack motor is mounted is reenforced by a pair of parallel ribs 38 which are positioned upon opposite sides of an opening 39 in which the gearing between the rack motor and the axle is mounted. The ribs 38 are in the form of plates extending between the cross bar 23 and the end bar 32 and are integrally united with the platform plate 27 and with the cross bars 23 and 32 by welds 40.

To the inner side of the side member 10 opposite that to which the gear pocket 21 is attached, there is a gear pocket 41 which forms the lower half of the gear housing I, and this gear pocket is in the form of a flanged stamping integrally united along the edge of its flange to the web of the side member by welds 42. The gear pocket 41 is mounted forwardly of the main cross bars 23 and 24 and may be formed from a plate of lighter gauge than the plate from which the gear pocket 21 is formed.

The upper flanges of the side members 10 are cut away at the forward ends thereof and a platform plate 43 extends across the front of the frame in the plane of the top flanges of the side members and is integrally united to the upper edges of the webs 11 where the flange 12 is cut away by welds 44. An angle cross bar 45 joins the forward ends of the side members 10 and is arranged with its upper flange flush with the upper edge of the web 11 so that the platform plate 43 rests thereon, and this cross bar is integrally united at its ends to the webs of the side members by welds 46 and to the platform plate by welds 46ª. The platform plate 43 is notched to receive the gear pocket 41 and is joined to the gear pocket by welds 47. An angle cross bar 48 is secured upon the top of the plate 43 along its inner edge and is integrally united to the plate by welds 49.

The joints between the frame members are preferably all made by metallic arc welding, the part to be joined being arranged with the edge of one in contact with the face of the other and then joined by directing the metallic arc into the angle between the abutting parts. The welds may be made continuous throughout the length of the abutting edge or they may be made at intervals, as indicated in the drawing. Where one of the two parts being joined contacts with the other throughout its length, the welds are preferably made at intervals, and where one of the parts abuts the part to which it is to be joined at its end, the weld may be made continuous. The cross bars, such as the main load bars 23 and 24 and the end bars 32 and 45, are preferably joined to the webs of the side members by continuous welds and to the platform plates at intervals along their lengths.

The upper flanges 12 of the side members have welded upon their upper surfaces spaced bearing pads 50 which form supports for the drive shaft bearings 51 and the drum shaft bearings 52. The bearings 51 and 52 are provided with notches 53 upon opposite sides thereof to receive the bearing pads 50, and the bearings are held in place by means of bolts 54 extending through the pads 50 and the flanges 12. The bearing pads are preferably joined to the flanges 12 by welding. The motor platform plate 27 has welded upon its top surface a pair of longitudinally extending pads 55 and 56 which form supports for the motor and brake, and these pads are provided with bolt holes 57 to receive the motor and brake clamping bolts. The plate 27 is also provided with bearing pads 58 and 59 which are welded thereto and form supports for the rack motor, these pads being provided with bolt holes 60 to receive the bolts for clamping the rack motor in place. Adjacent the opening 39, the plate has additional pads 61 welded thereto, and these pads are provided with bolt holes 62 to receive the bolts for clamping the bearings of the shafts for the gears through which the axle is driven from the rack motor.

All of the bearing pads are in the form of flat plates upon the top surfaces of the frame, and these pads provide bearing and motor supporting surfaces above the plane of the frame members which may be accurately machined after they are secured in place on the frame to compensate for any warping or any irregularity in the frame structure, making it unnecessary to perform any machining operations upon the rolled frame members after the completion of the frame.

By providing the stiffening rib plates 17 and 19 in the channels of the side members 10 the necessary strength is provided in rolled channels of less depth than would otherwise be required and by joining the main load supporting cross members 23 and 24 through the gear pocket 21 to one of the side members, rigid cross bracing is provided without extending the cross members below the lower edges of the side members.

The welded joints serve to provide an extended integral union between side and cross members and between the individual cross members so that the frame is capable of effectively resisting racking stresses and this together with the use of rolled bars and plates only in the construction of the frame makes possible the construction of a relatively light frame of great strength, rigidity and durability.

Having thus described my invention, I claim:

1. A fabricated hoist trolley frame having side and cross members integrally united by welding, and plates integrally united by welding along opposite edges to said side members and welded to said cross members.

2. A fabricated hoist trolley frame having side and cross members integrally united by welding, plates integrally united by welding along opposite edges to said side members and welded to said cross members, and intermediate stiffening members welded to one of the plates and cross members.

3. A fabricated hoist trolley frame having side and cross members integrally united by welding, plates integrally united by welding along opposite edges to said side members and welded to said cross members intermediate stiffening members welded to one of the plates and cross members, and stiffening members welded to said side members.

4. A fabricated hoist trolley frame having side and cross members integrally united by welding, gear pockets welded upon the inner sides of the side members, and a platform plate welded along opposite edges to said pockets and side members and lengthwise thereof to said cross members.

5. A fabricated hoist trolley frame composed of side members, connecting cross members, and platform members all of rolled steel and integrally united by welding.

6. A fabricated hoist trolley frame having flanged side members, cross members having their ends integrally united with the side members by welding, and a platform plate having opposite side edges integrally united with the side members by welding and front and rear edges integrally united with cross members by welding.

7. A fabricated hoist trolley frame having flanged side members, cross members having their ends integrally united with the side members by welding, a platform plate having opposite side edges integrally united with the side members by welding and front and rear edges integrally united with cross members by welding, and stiffening members welded at their ends to said cross members and along their upper edges to said plate.

8. A fabricated hoist trolley frame having side members formed by rolled channel bars provided with reenforcing ribs extending transversely of the channels of said bars and integrally united by welding to the web and flanges thereof, and cross members connecting said side members and integrally united thereto by welding.

9. A fabricated hoist trolley frame having side members formed by rolled channel bars, cross bars joining said side members and integrally united thereto by welding, and a motor supporting platform comprising a steel plate integrally united by welding to said side members and cross bars.

10. A fabricated hoist trolley frame having side members formed by rolled channel bars, cross bars joining said side members and integrally united thereto by welding, a motor supporting platform comprising a steel plate integrally united by welding to said side members and cross bars, and reenforcing ribs upon the under side of said plate comprising flat steel strips welded along their top and end edges to said plate and cross bars.

11. A fabricated hoist trolley frame having rolled structural steel side members, rolled steel cross members integrally united by welding to said side members, and bearing pads formed of flat steel plates welded upon the top surfaces of said frame members.

12. A fabricated trolley frame having rolled steel side members provided with flat inner faces and outwardly projecting flanges, a gear pocket welded to the inner face of one of the side members, and a flanged cross member extending between the gear pocket and the opposite side member and welded at its ends to the latter side member and to said gear pocket.

13. A fabricated trolley frame having rolled steel side members provided with flanges and vertically disposed webs, gear pockets welded to the inner sides of the webs, and cross members welded to the webs of said side members and to said gear pockets.

14. A fabricated trolley frame having rolled steel side members provided with vertically disposed webs and flanges along the tops and bottoms of the webs, cross bars integrally united by welding to the webs of said side members, and platform plates spanning the space between said side members and integrally united with said side members and cross bars by welding.

15. A fabricated trolley frame having rolled steel side members provided with vertically disposed webs and flanges along the tops and bottoms of the webs, said side members having their ends undercut, shoulder plates fitting in the undercut ends of said members and integrally united to the lower flanges and webs of said side members, and cross members extending between the side members and integrally united thereto by welding.

16. A fabricated trolley frame having rolled steel side members provided with vertically disposed webs and flanges along the tops and bottoms of the webs, said side members having their ends undercut, shoulder plates fitting in the undercut ends of said members and integrally united to the lower flanges and webs of said side members, reenforcing ribs between the flanges of the side members formed by plates integrally united by welding to the flanges and webs of said members, reenforcing gussets welded to said webs and to said shoulder plates, and cross members extending between said side members and integrally united thereto by welding.

In testimony whereof, I hereunto affix my signature.

WILLIAM G. WEHR.